United States Patent [19]

Urbansky

[11] Patent Number: 5,327,430
[45] Date of Patent: Jul. 5, 1994

[54] CIRCUIT ARRANGEMENT FOR BIT RATE ADAPTATION

[75] Inventor: Ralph Urbansky, Schwaig, Fed. Rep. of Germany

[73] Assignee: U.S. Philips Corporation, New York, N.Y.

[21] Appl. No.: 993,259

[22] Filed: Dec. 18, 1992

Related U.S. Application Data

[63] Continuation of Ser. No. 628,799, Dec. 17, 1990, Pat. No. 5,195,088.

[30] Foreign Application Priority Data

Dec. 23, 1989 [DE] Fed. Rep. of Germany ....... 3942883

[51] Int. Cl.⁵ ................................. H04J 3/06
[52] U.S. Cl. .................... 370/84; 370/105.3; 370/108; 375/118
[58] Field of Search .............. 370/84, 102, 105.3, 370/108; 375/118; 369/60; 307/475; 331/1 A; 328/155, 133; 377/39

[56] References Cited

U.S. PATENT DOCUMENTS

| | | | |
|---|---|---|---|
| 4,072,826 | 2/1978 | Aveneau | 370/102 |
| 4,224,481 | 9/1980 | Russell | 369/60 |
| 4,764,942 | 8/1988 | Shigaki et al. | 375/118 |
| 4,791,652 | 12/1988 | McEachern et al. | 375/118 |
| 4,811,340 | 3/1989 | McEachern et al. | 375/118 |
| 4,888,564 | 12/1989 | Ishigaki | 331/1 A |
| 4,928,275 | 5/1990 | Moore et al. | 375/118 |

OTHER PUBLICATIONS

"The Art of Electronics", (2nd Ed.), published by Cambridge University Press, 1989, pp. 641, 644 and 647.

Primary Examiner—Douglas W. Olms
Assistant Examiner—Min Jung
Attorney, Agent, or Firm—Anne E. Barschall

[57] ABSTRACT

A circuit arrangement for adapting the bit rates of two signals to each other comprises an elastic store (6). The useful data of a first frame-structured signal are written into this store (6) by means of a write address counter (7) and read out again by means of a read address counter (8). A phase comparator (16) is used for comparing the counts of these counters (7, 8). In order to largely avoid jitter in the signal that has been read, the read address counter (8) and the phase comparator (16) are incorporated in a control circuit that controls the clock for the read address counter (8). In this control circuit the output signal of the phase comparator (16) is the control error. The controlled system (17) of the control circuit consists of a controllable oscillator circuit with whose output signal and read address counter (8) is clocked. In order to avoid stationary phase shifts with a constant frequency shift, a controller (18) having a PI behavior (PI=proportionality and integration) is used.

3 Claims, 2 Drawing Sheets

CIRCUIT ARRANGEMENT FOR BIT RATE ADAPTATION

This is a continuation of application Ser. No. 07/628,799, filed on Dec. 17, 1990, now patented U.S. Pat. No. 5,195,088.

BACKGROUND OF THE INVENTION

Field of the Invention

The invention relates to a circuit arrangement for adapting the bit rates of two signals to each other, which arrangement comprises an elastic store into which the useful data of a frame-structured first signal are written with the aid of a write address counter and read out again with the aid of a read address counter, and further comprises a phase comparator for comparing the counts of these counters.

A circuit arrangement of this type is disclosed in German Patent Application DE-A-39 20 391 (filing date: Jan. 22, 1989); in digital transmission systems this arrangement is necessary for recovering the frame-structured useful data as plesiochronous data signals. Therefore, only the useful data are written into the elastic store because the counter is stopped during all other data in the signal and the count of the write address counter denotes the addresses at which useful data are stored in the elastic store. Accordingly, the count of the read address counter denotes the addresses of the memory locations from which the useful data can be read out again.

Reading the useful data is to be effected in a manner such that the deviations from the nominal bit rate of the recovered presiochronous signal remain within the prescribed tolerance limits. A correction of the reading speed within these tolerance limits is necessary, for example, to prevent the elastic store from overflowing. Therefore, the counts of the two counters are to be monitored. The phase comparator, which produces the difference between the counts or a value equivalent thereto, is used for this monitoring. If the output signal of the phase comparator is used as a control error for a customary phase-locked loop, by means of which loop the clock for the read address counter is generated, this has the advantage that with large abrupt control errors the read clock and also the presiochronous signal will be affected by a strong jitter.

Such control errors occur, for example, when the useful data are transmitted in a Synchronous Transport Module-1 (further details below). The write address counter must then be stopped for several bytes; thus it runs highly erratically. This erratic operation is also reflected in the control error resulting in the above mentioned disadvantageous consequences for the presiochronous signal.

SUMMARY OF THE INVENTION

It is an object of the invention to provide a circuit arrangement having the characteristic features mentioned in the opening paragraph, in which jitter in the clock for the read address counter is largely avoided.

This object is achieved in that the read address counter and the phase comparator are constituent parts of a control loop by means of which the clock for the read address counter is controlled. The output signal of the phase comparator is applied to a control circuit as a control error, and a controllable oscillator circuit is provided as a controlled circuit for producing a read data signal by means of which the read address counter is clocked.

Such control of the clock for the read address counter is advantageous in that relatively large frequency shifts of the oscillator circuit can be produced.

A first advantageous embodiment has the feature that a phase-locked loop (PLL) whose input signal is proportional to the control error of the control loop serves as a controllable oscillator circuit. This embodiment renders the control loop more insensitive to disturbances.

In a further advantageous embodiment the controller comprises at least one non-linear amplifying element by means of which large control errors are amplified more than proportionally. Such a non-linear element provides an accelerated stabilization of large control errors.

If a PI behaviour (PI=proportionality and integration) is provided by the controller, stationary phase shifts due to a constant frequency shift are avoided.

BRIEF DESCRIPTION OF THE DRAWINGS

The invention will be further explained with reference to the drawing Figures and an exemplary embodiment, in which.

DESCRIPTION OF THE PREFERRED EMBODIMENTS

Figure 1:
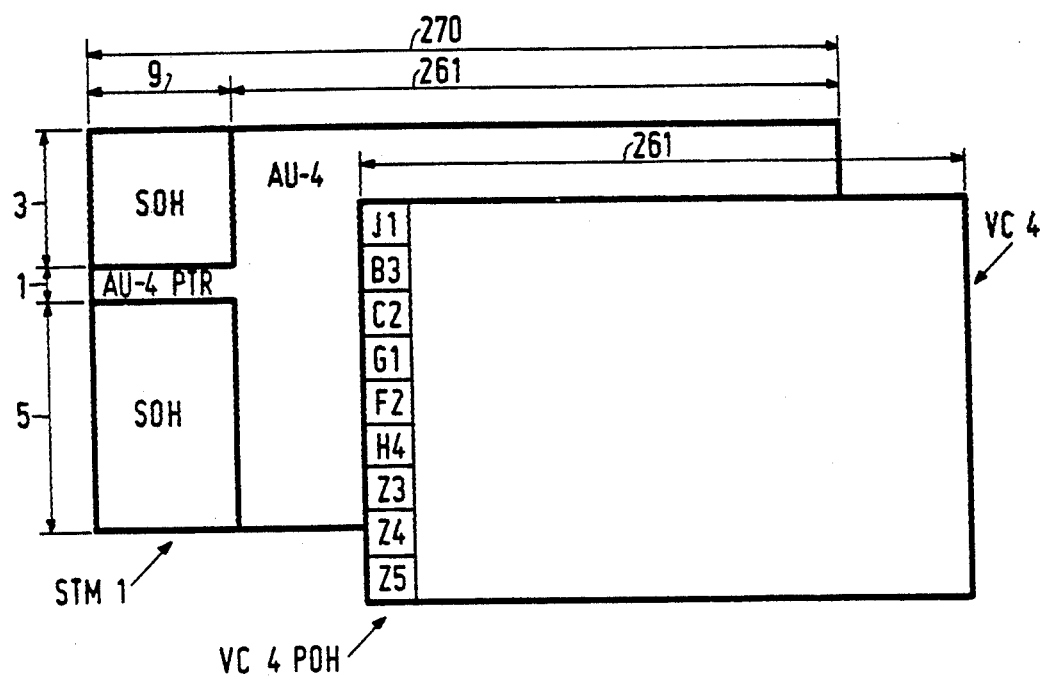
FIG. 1 shows a diagrammatic representation of the frame structure of a Synchronous Transport Module-1 (STM-1) pursuant to the CCITT Recommendations digital data transmission.

In the diagrammatic representation of an STM-1 data frame as shown in FIG. 1 all binary information of the frame is subdivided into rows. The frame consists of nine rows as can be understood from the numbers on the left in FIG. 1. Each row contains 270 bytes denoted by the number at the top of FIG. 1. The whole frame is subdivided into three areas (for details compare, for example, CCITT Recommendations G.707, G.708, G.709, Blue Book Geneva 1988).

The first area consists of the actual useful information, included in a defined unit of data storage denoted as a virtual container VC4, which is also represented in FIG. 1 by way of rows. Each row of the virtual container VC4 consists of 261 bytes; each of the rows is headed by one-bye long control information J1, B3, C2 ... Z5. The remaining bytes of the container VC4 of the 18 fixed stuff bytes, a single special byte containing six useful bits, one fixed and one justification opportunity bit, and 241 useful bytes. The justification indications for the justification opportunity bits are contained in five of the fixed stuff bytes.

The second area of the frame is the section overhead SOH filling the first nine bytes of specific frame rows. This area contains bytes used, for example, for frame alignment, error monitoring and network management.

The third area is the pointer area PTR of the administration unit AU-4. Here there are bytes which, inter alia, denote the position of the virtual container VC4 within a frame. This position is not fixed and neither is it linked with the frame structure, i.e. the container can commence in one frame and terminate in a second frame. Furthermore, the pointer row provides place for six bytes used for clock alignment and which in exceptional cases in taken up either by meaningless stuffing bytes (positive byte justification) or taken up all by additional useful information bytes (negative byte justification). As a rule, three bytes containing justification bits and three bytes containing information bits are present. The justification indication for this byte justification is also contained in the pointer area.

The overall frame period is 125 μs; this corresponds to a 155.52 Mbit/s bit rate.

Figure 2:
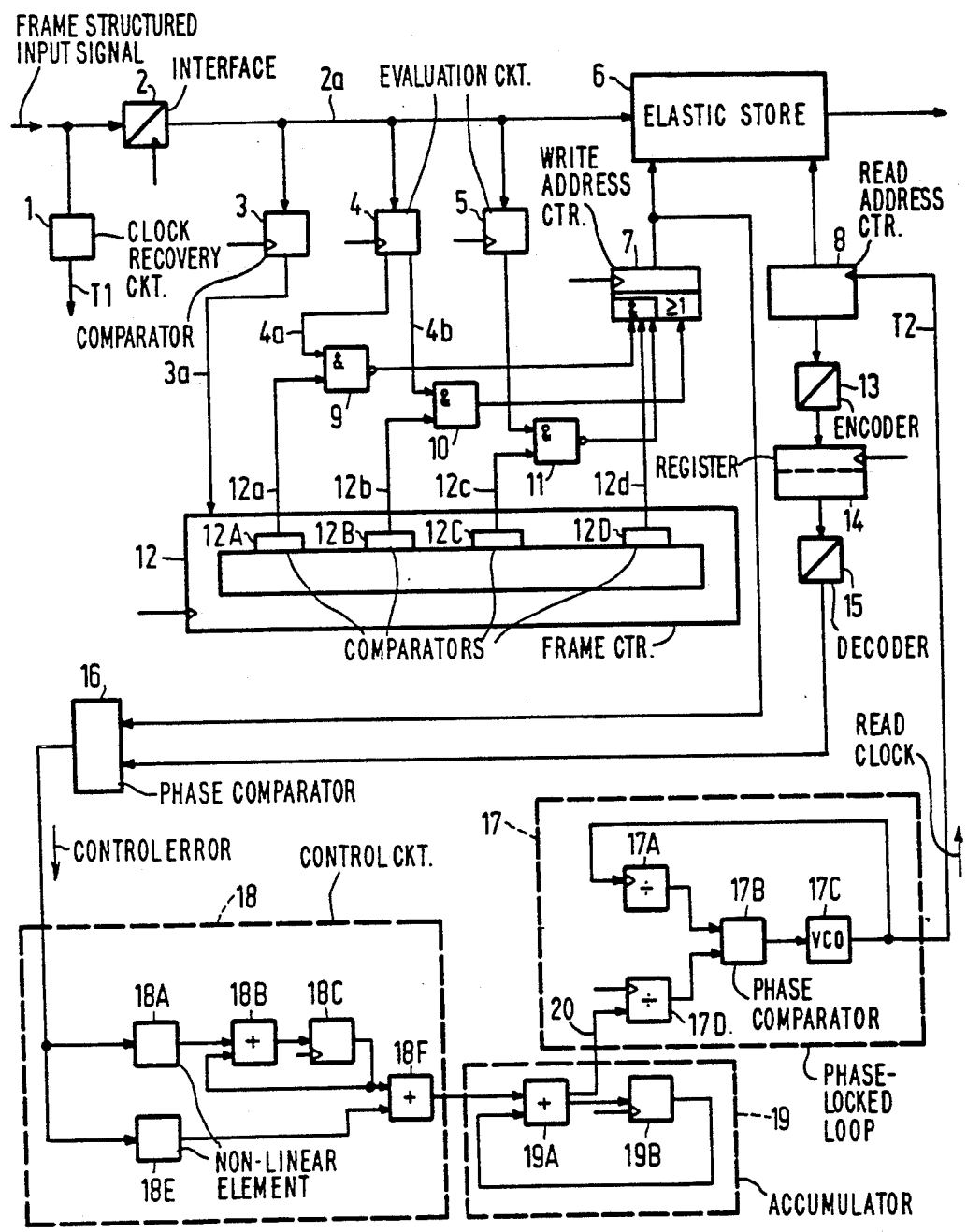
FIG. 2 shows a clocked data rate adaptation circuit arrangement having characteristic features according to the invention.

The main components of the circuit in accordance with the invention as shown in FIG. 2 are a buffer memory 6, a write address counter 7, a read address counter 8, a frame counter 12 and a control loop comprising the circuit units 8, 16, 18, 19 and 17 as will be further explained herein below. The count of the write address counter 7 and the count of the read address counter 8 are compared to each other by means of a comparator 16 whose output signal constitutes the control error of the aforementioned control loop. This control loop controls the read clock signal T2 for the read address counter 8 with which the bits are read from the buffer memory 6. The nominal bit rate of the clock T2 is 129.264 MHz.

Two requirements are attached to a change of this clock. First that, when possible, the distance between write and read addresses is equal to a predetermined distance during the entire operation of the circuit arrangement and second that the deviation of the read clock T2 from 139.264 MHz remains within prescribed boundaries (±15 ppm). How these two requirements are fulfilled simultaneously in accordance with the invention will now be explained in detail.

A CMI encoded input signal structured in STM-1 frames is applied to a clock recovery circuit 1 and a receive interface 2. The receive interface 2 produces a binary encoded input signal from the CMI encoded signal and the clock recovery circuit generates the bit clock T1 necessary for the binary signal. All clock dependent building blocks of the circuit according to FIG. 2 are timed with this bit clock T1 unless not expressly stated otherwise.

A comparator 3 transmits a pulse to the set input of the frame counter 12 over a line 3a in response to the frame alignment codeword in a signal on a line 2a.

The frame counter 12 counts all bits of a frame and produces one-bit long pulses at its outputs 12a to 12d when it passes through predetermined counts. Comparator circuits producing such pulses are denoted by reference characters 12A to 12D. Their internal structures will be obvious from the operation details. This also holds for all further building blocks which are only characterized by their mode of operation.

An evaluation circuit 4 evaluates the justification indication for bytes contained in the pointer area. This information indicates that at a subsequent and predetermined position of the frame there has been performed a positive or negative justification at the transmit end. If, contrary to the rule, there has been a positive byte justification, a logic "one" will be produced on line 4a for the duration of one frame, which logic value will affect a NAND-gate 9 in a manner such that its output moves to a logic "zero" when the comparator circuit 12A establishes that the frame counter is reading those bits belong to the justified byte.

By means of the output signal of the NAND-gate 9 the write address counter 7 is stopped so that the justified bytes are not also written into the buffer memory 6. If, contrary to the rule, there has been a negative justification, the appropriate bytes will contain useful information bits and the write address counter 7 will have to proceed so that also these bytes are written into the buffer memory 6. In that case the evaluation circuit 4 produces at its output 4b a logic "one" which, together with an AND-gate 10, the comparator circuit 12B and the logic contained in the write address counter, causes the counter to continue counting without any complications. The logic in the write address counter 7 consists of an AND-gate that has three inputs and an OR-gate that has two inputs, its first input being connected to the output of the AND-gate 10 and its second input being connected to the output of the AND-gate included in the write address counter 7.

Since an ATM-1 frame also comprises single justification bit positions which may be occupied by a useful information bit or a stuffing bit, a second evaluation circuit 5 is provided which evaluates the justification indication for these single bits. If justification has taken place, the evaluation circuit 5 will apply a full row of logic "ones" to an input of a NAND-gate 11, whose other input is connected to the output of the comparator circuit 12C by means of line 12C. The comparator circuit 12C produces a pulse when the frame counter has reached the position of the justification bit. This pulse sets the output of the NAND-gate 11 to logic "zero" and thus stops the write address counter 7 for one clock period, due to the connection to the AND-gate of the write address counter 7. If no justification has taken place, the write address counter will continue operating at the justification bit position.

All the bits or bytes that belong to the Overhead area or Pointer area and never contain useful information bits are not written into the buffer memory 6 either. The write address counter 7 is stopped at the positions concerned with means of the comparator circuit 12D and a line 12d leading to an input of the AND-gate included in the write address counter 7. At positions not usually containing useful information, the write address counter is also stopped by the comparator circuit 12D unless the continuation of the operation is not given priority to (compare above).

The addresses produced in binary bode by the read address counter 8 are first converted by an encoder 13 into the Gray-code, stored in a register 14 with the clock T1 and subsequently reconverted into the binary code by means of a decoder 15.

The purpose of using the Gray-code is that in this manner the fewest errors are made when the read addresses are aligned with clock T1. The alignment is necessary for the subtraction performed by the phase comparator 16; the latter forms the difference between the counts of the counters 7 and 8 shifted by the prescribed nominal distance between write and read addresses. If its output signal is "zero", the write and read addresses have their prescribed nominal distance.

A control circuit 18 is arranged in a manner such that it is capable of directly processing the binary encoded row deviations signified by the control error signal from phase comparator 16. It comprises two branches, a first branch including a non-linear amplifier element 18A and an accumulator 18B, 18C and also a second branch that includes a non-linear amplifier element 18E. The first branch determines the I-behaviour (I=integration) and the second branch the P-behaviour (P=proportionality) of the control circuit. The signals of the two branches are added together by means of an adder 18F.

The two non-linear amplifier elements 18A and 18E amplify large values of row deviation more than proportionally, which results in that large row deviations are more rapidly corrected by the read clock T2. It has proved to be favourable to allow the disporportionality for the I-branch to be considerably larger than for the P-branch.

In the exemplary embodiment the controlled circuit 17 of the control loop is a phase-locked loop comprising circuit units 17A, 17B, 17C and 17D. The unit 17B is the phase comparator of the phase-locked loop and the module 17C comprises, inter alia, the voltage-controlled oscillator of the phase-locked loop and possibly filters. The dividers 17A and 17D divide the controlled variable and the controllable variable of the phase-locked loop at a 1:16 ratio.

Since only variable frequency pulse sequences are used as the controlling variable for the phase-locked loop, the output signal of the adder 18F is converted or transformed into a variable frequency pulse sequence by an accumulator circuit 19 (sigma-delta-modulator). In an adder 19A the output data of the adder 18F and those of a register 19B are added together and—except for a carry—written into the register once again. The frequency of the carry pulses sequence via conduction 20 is proportional to the magnitude of the accumulated numbers in adder 18F.

In other words, the frequency of the sequence of carry pulses, which via line 20 serve as input to the PLL 17, is proportional to the number of adder 19A overflows per unit of time, and said number of overflows is in turn proportional to the magnitude of the output signal of the adder 18F, which is each time supplied to the accumulator 19.

I claim:

1. A circuit arrangement for converting the bit rate of a frame structured input signal to a predetermined nominal bit rate, each frame of said input signal including data bits and auxiliary bits; said circuit arrangement comprising:

an elastic store for receiving and storing data bits of the input signal;

a write address counter for writing data bits of said input signal into said elastic store at the bit rate of said signal, keeping count of the data bits written therein;

a read address counter for reading-out the stored data bits and keeping count thereof, read-out being at a bit rate in accordance with a read clock supplied to said read address counter;

a phase comparator for determining the distance between the counts of said write address counter and said read address counter, and producing a control error signal corresponding to such distance;

a control circuit responsive to said control error signal to produce a frequency control signal;

a transformation circuit for transforming the frequency control signal into a pulse sequence with variable frequency; and a read clock generating circuit for supplying said read clock to said read address counter substantially at said predetermined nominal bit rate, said read-clock generating circuit comprising an oscillator for receiving said pulse sequence and being controlled thereby to vary the bit rate of the read clock relative to said predetermined nominal bit rate in accordance with said pulse sequence; and said phase comparator, control circuit, read clock generating circuit and write address circuit constituting a control loop whereby the bit rate of the read clock is controlled so as to rapidly restore the distance between the counts of said write address counter and said read address counter to a desired value in the event of abrupt departures from such desired value due to abrupt changes in the bit rate of said input signal.

2. The circuit of claim 1 wherein the transformation circuit comprises an accumulator for periodically adding the frequency control signal to the content of the accumulator and wherein the pulse sequence comprises pulses generated by the accumulator during overflow.

3. The circuit of claim 1, wherein the read clock generating circuit comprises a phase-locked loop.

* * * * *